R. Gidley,
Gate.
No. 110,646. Patented Jan. 3, 1871.
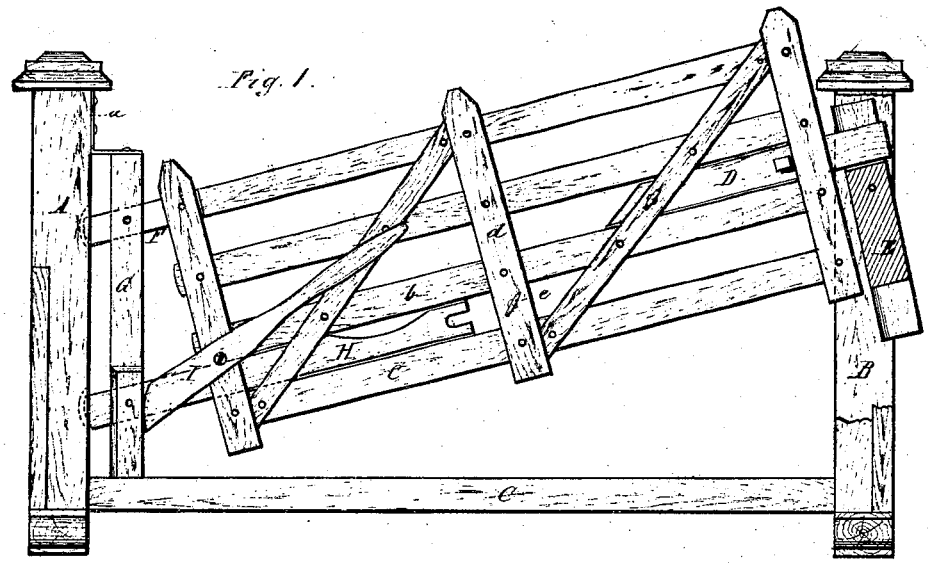
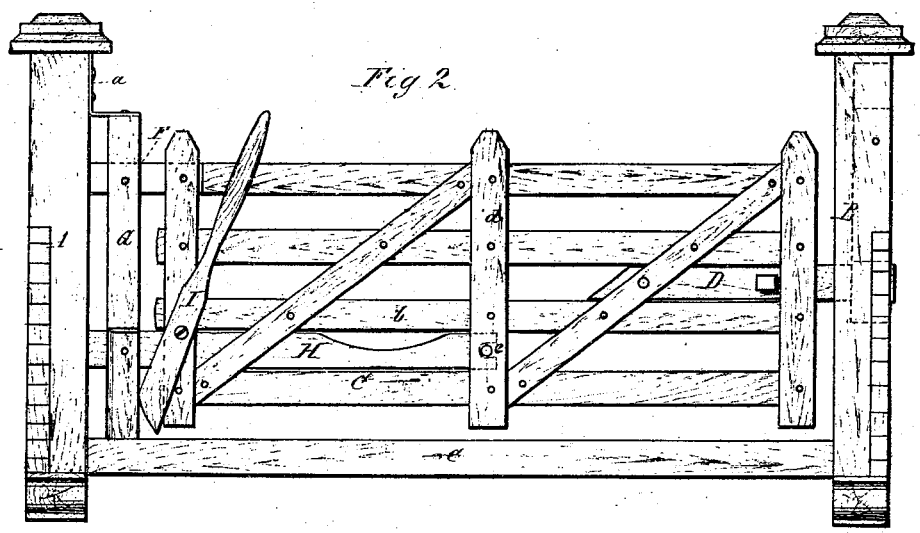
Witnesses:  Inventor:
  R. Gidley,
  Per
  Attorneys.

United States Patent Office.

ROBERT GIDLEY, OF LA GRANGEVILLE, NEW YORK.

Letters Patent No. 110,646, dated January 3, 1871.

IMPROVEMENT IN GATES.

The Schedule referred to in these Letters Patent and making part of the same.

*To all to whom it may concern:*

Be it known that I, ROBERT GIDLEY, of La Grangeville, in the county of Dutchess, and State of New York, have invented a new and improved Gate; and I hereby declare the following to be a full, clear, and exact description of the same, reference being had to the accompanying drawings forming a part of this specification.

My invention has for its object to combine with an ordinary farm-gate an arrangement of devices that will enable it to be readily adjusted and securely held in an inclined position; and The invention consists in the construction and combination of parts, as hereinafter fully explained.

Referring to Figures 1 and 2, of the accompanying drawings, forming part of this specification—

A and B indicate the posts of an ordinary farm-gate; and

C a bar, connecting the same, near the ground.

The gate is provided with a sliding locking-bar, D, shown partly in section, in fig. 1, which enters a slot or recess in the upper, and also the lower, end of a vibrating-bar, E, which is pivoted in a recess in the post B.

The upper hinge of the gate is formed by the extension F of its upper rail, or it may be formed by securing a short piece to said rail, or by other means, it being material only to pivot the rail or bar in a slot of the short post G, which is arranged to turn on its axis in the bar C, and the bracket *a*, attached to post A.

The lower hinge consists of a bar, H, also pivoted in a slot of the post G, and sliding between the rails *b c* of the gate.

Its free end is notched to fit over a pin, *e*, inserted in the central cross-bar *d*.

I indicates a hand-lever, pivoted to the hinged end of the gate and beveled at its lower end. A similar lever is pivoted to the gate on the opposite side.

The operation of the gate is as follows:

When in the horizontal position, as shown in fig. 2, the locking-bar D enters the recess in the lower end of the swinging bar E. On withdrawing the bar the gate may be swung in either direction, answering in all respects the purposes of an ordinary gate.

When it is desired to let sheep, hogs, or other small animals pass, and yet prevent large ones, such as bullocks, or horses, from doing so, the gate may be raised vertically, at its free end, by operating one of the levers I, the hinge-rail H, in that case, sliding backward between the rails *b c*. As the front of the gate rises it bears against the swinging-bar E so as to throw it into an inclined position, and the bar D will then lock the gate, as shown in fig. 1.

Having thus described my invention,

What I claim as new, and desire to secure by Letters Patent, is—

1. In combination with the free end of a gate, a swinging-bar, E, pivoted to the post B, and recessed at its upper end to receive a locking-bar, D, substantially in the manner described.

2. The combination of the hinge-bars or rails F H, post G, and lever, or levers, I, substantially as shown and described.

ROBERT GIDLEY.

Witnesses:
 JOHN W. VINCENT,
 ABM. W. IRISH.